(12) United States Patent
Schoo

(10) Patent No.: US 6,459,165 B1
(45) Date of Patent: Oct. 1, 2002

(54) DRIVE FOR A WINDMILL

(75) Inventor: Alfred Schoo, Bocholt (DE)

(73) Assignee: Winergy AG, Voerde (DE)

( * ) Notice: Subject to any disclaimer, the term of this patent is extended or adjusted under 35 U.S.C. 154(b) by 0 days.

(21) Appl. No.: 09/547,011

(22) Filed: Apr. 11, 2000

(30) Foreign Application Priority Data

Apr. 12, 1999 (DE) ........................ 199 16 454

(51) Int. Cl.$^7$ ................................. H02P 9/04
(52) U.S. Cl. ................ 290/1 C; 290/44; 290/55; 475/330
(58) Field of Search ............. 290/55, 44, 1 C; 475/342, 331, 330

(56) References Cited

U.S. PATENT DOCUMENTS

| | | | | |
|---|---|---|---|---|
| 4,239,977 A | * | 12/1980 | Strutman | 290/44 |
| 4,331,040 A | * | 5/1982 | Swasey | 74/409 |
| 4,391,163 A | * | 7/1983 | Benthake et al. | 475/337 |
| 4,557,666 A | * | 12/1985 | Baskin et al. | 416/32 |
| 4,871,923 A | * | 10/1989 | Scholz et al. | 290/55 |
| 5,222,924 A | * | 6/1993 | Shin et al. | 475/329 |
| 5,663,600 A | * | 9/1997 | Baek et al. | 290/55 |
| 5,679,089 A | * | 10/1997 | Levedahl | 475/332 |
| 5,876,181 A | * | 3/1999 | Shin | 415/2.1 |
| 6,176,804 B1 | * | 1/2001 | Kekki et al. | 475/331 |
| 6,232,673 B1 | * | 5/2001 | Schoo et al. | 290/55 |

FOREIGN PATENT DOCUMENTS

| | | | |
|---|---|---|---|
| DE | 2618882 | * | 11/1977 |
| EP | 0037002 | * | 10/1981 |
| EP | 0319750 | * | 6/1989 |
| EP | 0635639 | * | 1/1995 |
| WO | 9611338 | * | 4/1996 |
| WO | 9630669 | * | 10/1996 |

* cited by examiner

*Primary Examiner*—Joseph Waks
(74) *Attorney, Agent, or Firm*—Max Fogiel

(57) ABSTRACT

Transmission for a wind-power plant with blades (3) distributed around a rotor (1) and with a generator (6) mounted by way of an azimuth bearing (7) on a mast (27). The transmission is a two-stage planetary transmission with an input stage and an output stage, and the input stage is directly connected to the rotor. The input stage (4) is provided with double-helical cogs and the output stage (5) with single-helically cogged planet wheels.

7 Claims, 2 Drawing Sheets

DRIVE FOR A WINDMILL

BACKGROUND OF THE INVENTION

The present invention concerns a transmission for a wind-power plant.

Contemporary wind-power plants are increasingly affected by ecological and environmental demands. Economy requires that up-to-date plants compete with such conventional methods of harvesting energy as fossil-fueled and nuclear-power plants. This demand assumes the availability of high-output, light weight-per-output, and compact systems. Strength and environmental considerations (e.g. noise) on the other hand require the reduction of dynamic stress. The sites must be as continuous in area, as exposed to strong winds, and as low-populated as possible. One possibility is offshore plants, which, due to the additional expenditure involved in installation, must be even more powerful and compact and lighter in weight.

The transmission trains employed in known wind-power plants (European Published Patent 635 639) comprise rotor blades, a hub with a shaft and bearing set, a multiple-stage planetary gear, a coupling, and a generator. The blades are mounted on the hub and rotate the shaft. The shaft is accommodated in a large roller bearing connected to an azimuth bearing by way of a frame. The force of the wind against the rotor are accordingly transmitted to a mast. This bearing system requires interposing part of the shaft between the rotor and the transmission. The downstream roller bearing consists of a transmission section with a hollow input shaft that is connected to the rotor shaft by an overturned disk. The overall transmission is also mounted on the frame by way of a two-armed torque-accommodating strut, This known wind-power plant occupies a lot of space and is accordingly restricted in output.

European Published Patent 811 764 describes a wind-power plant wherein the rotor is integrated directly into the base of a single-stage planetary transmission. The transmission and its generator are mounted on the same frame.

WIPO 96/11338 describes a two-stage planetary transmission with two simple-cogged planetary wheels and intended for a wind-power plant. The rotor is directly integrated into the planetary base and its bearing set is accommodated in a housing. How the transmission is connected to the plant itself is not described.

SUMMARY OF THE INVENTION

The object of the present invention is a wind-power plant that is more compact and accordingly appropriate for higher outputs, of 2.5–5 MW, is only slightly heavier, and is less complicated.

Directly connecting the hub to the input stage of the two-stage planetary transmission renders the transmission more compact. The device can be even more compact if the hub is connected to the transmission's housing, in which event the whole transmission can be housed in the hub. The double-helical cogs in the input stage and the single-helical cogs on the planetary wheels in the output stage ensure higher transmission ratios in less space. Furthermore, the transmission in accordance with the present invention needs no frame, and its or the generator's housing can be directly connected to the azimuth bearing.

BRIEF DESCRIPTION OF THE DRAWINGS

Two embodiments of the present invention are illustrates in the accompanying drawing and will now be specified with reference thereto, whereby.

DESCRIPTION OF THE PREFERRED EMBODIMENTS

Figure 1:
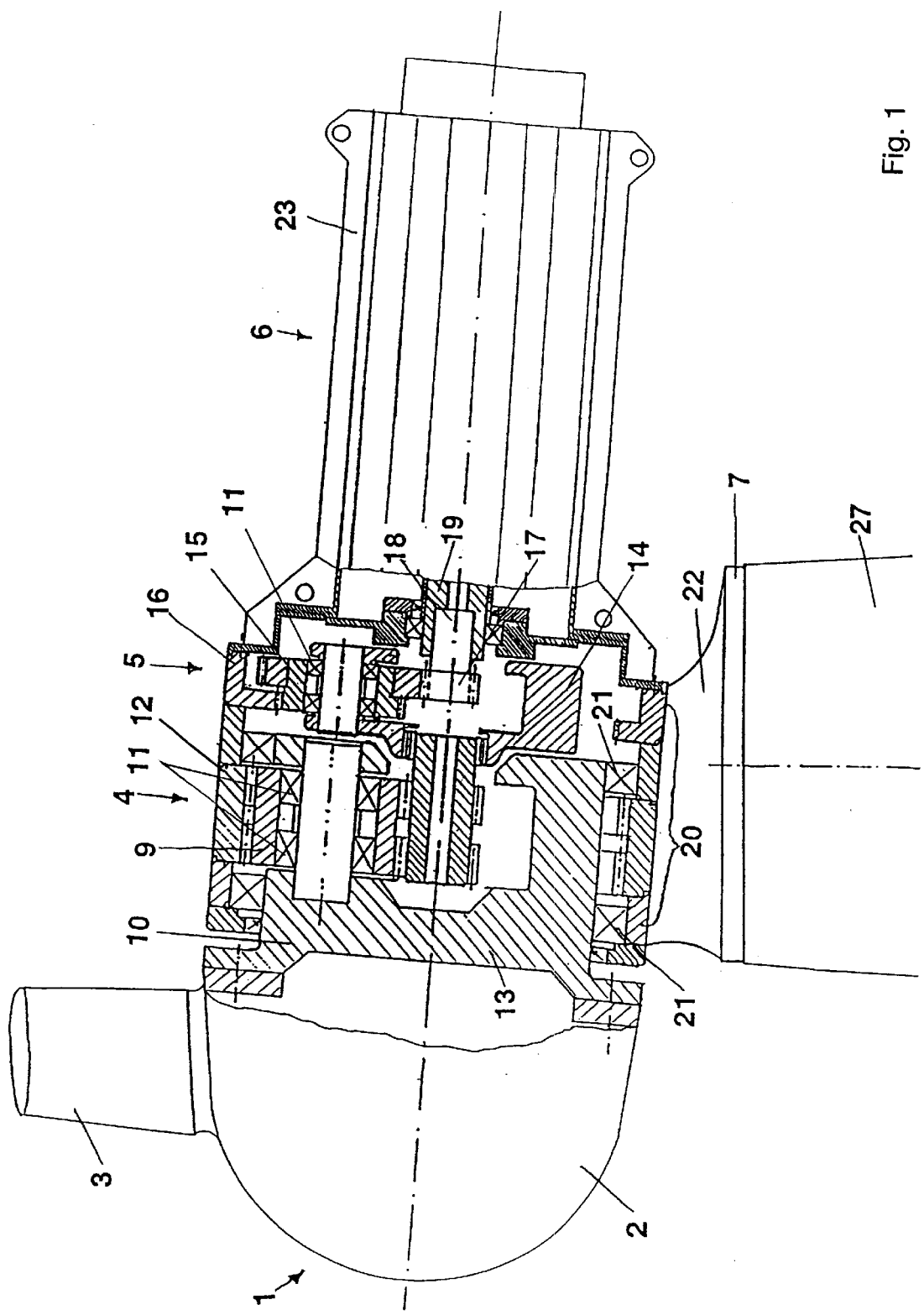
FIG. 1 is a longitudinal section through one embodiment of a win power plant and FIG.2 a longitudinal section through another embodiment.

The illustrated wind-power plant includes a rotor 1 with several blades 3 secured in a hub 2. Rotor 1 is connected to a generator 6 by way of a two-stage planetary transmission comprising an input stage 4 and an output stage 5. The plant is mounted on a mast 27 by way of an azimuth bearing 7 and is headed into the wind by an azimuth transmission 8.

The input stage 4 of the planetary transmission is a double-helically cogged planetary stage and accommodates, depending on how much stress it is exposed to, three or four planetary wheels 9 distributed uniformly along the circumference of a base 10. The wheels' bearings 11 can be either roller bearings or friction bearings. Planetary wheels 9 engage a hollow wheel 12 and a sun wheel 13. Planetary wheels 9, hollow wheel 12, and sun wheel 13 are part of input stage 4 and are provided with double-helical cogs.

Sun wheel 13 is connected to another planetary base 14, which it can slide back and forth along but not rotate in, ensuring a uniform distribution of stress. To relieve output stage 5 as well of as much stress as possible, base 14 is also movable and secured only by its cogs.

Several planetary wheels 15 are accommodated in roller or friction bearings in base 14. To obtain higher transmission ratios, planetary wheels 15 constitute staged planets, one stage engaging a hollow wheel 16 and the other a sun wheel 17 in output stage 5.

A shaft 18 that extends into a sun wheel 19 in output stage 5 constitutes in conjunction with the shaft 19 of a rapid-action generator 6 a single unit. It would alternatively be possible to machine sun wheel 17 directly into shaft 19 or to insert sun wheel 17 into the system in the form of a pinion.

The hollow wheel 12 in input stage 4 and the hollow wheel 16 in output stage 5 screwed and into transmission housing 20, constituting a single unit in conjunction with it. It would alternatively be possible to integrate the wheels into the housing.

The hub 2 illustrated in FIG. 1 is directly connected to, screwed for example into, the base 10 of input stage 4. Base 10 is secured between two large roller bearings 21 that also act as a bearing set for rotor 1 in transmission housing 20. Base 10 accordingly transmits the forces or all the winds acting on blades 3 the housing. Housing 20 is also provided with a foot 22, by way of which it screws directly onto azimuth bearing 7 and can transmit the forces into mast 27. The housing 23 that accommodates generator 6 is flanged directly to transmission housing 20.

Figure 2:
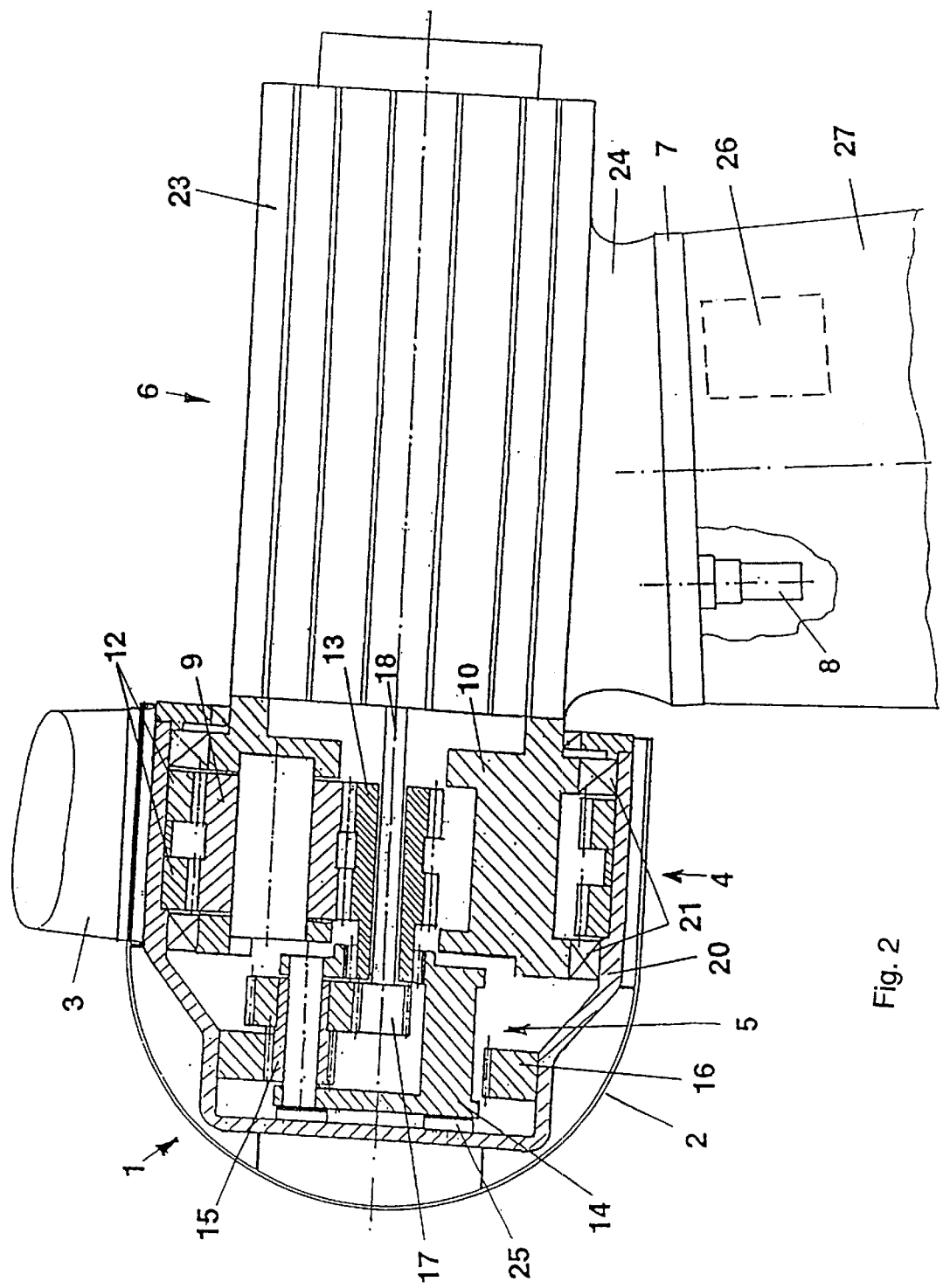

As will be evident from FIG. 2, the planetary transmission is entirely contained in hub 2. Transmission housing 20 is connected to hub 2 and accordingly accommodates its input rotations. Both the hollow wheel 12 in double-helically cogged input stage 4 and the single-helically cogged hollow wheel 16 in output stage 5 are accommodated in rotating transmission housing 20 and constitute a coupling. Input stage 4 is upright, and its base 14 is stationary and fastened to the housing 21 of generator 6. The base 10 of input stage 4 also accommodates the two large roller bearings 21 that support transmission housing 20 and hence hub 2 as well. Roller bearings 21 transmit all the wind forces acting on blades 3 to generator housing 21. Housing 21 itself is also provided with a foot 24 that screws onto azimuth bearing 7, transmitting all the forces directly into mast 27.

To allow the base 10 of input stage 4 to screw directly onto the housing 21 of generator 6, input stage 4 must be interposed between generator 6 and output stage 5. It will accordingly also be necessary for the shaft 18 of the sun wheel 17 in output stage 5 to extend through the sun wheel 13 in input stage 4.

Since the free end of the shaft between the transmission and generator exploited in conventional wind-power plants to support a disk brake is no longer part of the embodiment illustrated in FIG. 2, a lubricated brake 25 must be installed in transmission housing 20. When brake 25 is activated, the base 14 in output stage 5 will prevent from rotating with transmission housing 20.

To increase output, generator 6 can be oil-cooled, the lubricating system communicating to advantage with that of the overall transmission. To keep the housing for the overall device compact or to do away with it entirely, such subassemblies as lubricating system 26, the electrical connections, and azimuth transmission 8 can be accommodated in the top of mast 27.

What is claimed is:

1. A transmission arrangement for a wind-power plant comprising a rotor with blades distributed around said rotor; transmission means; a generator connected to said transmission means; said transmission means and said generator being mounted by an azimuth bearing on a mast; a two-stage planetary transmission with an input stage and an output stage; said input stage and said output stage each having a planetary base carrier, planet gears, a hollow wheel and a sun wheel; said input stage having double-helical tooth forms and said output stage having single-helically geared planet wheels; said planet gears in said output stage being staged with planetary stages, one of said planetary stages engaging said hollow wheel and another of said planetary stages engaging said sun wheel; a transmission housing, said planetary base carrier in said input stage being mounted in said transmission housing by two large roller bearings comprising also a bearing set for said rotor; said sun wheel in said input stage being shiftable back-and-forth in said planetary base carrier in said output stage; said sun wheel being inhibited from rotating in said planetary base carrier in said output stage, said planetary base carrier in said output stage being slidable back-and-forth and being secured only by gears; a hub in said rotor and being connected to said planetary base carrier in said input stage; a generator housing connected to said transmission housing, said transmission housing having a foot connected to said azimuth bearing; said planet gears in said output stage with said planetary stages reducing sensitivity to bending effects.

2. A transmission arrangement for a wind-power plant comprising: a rotor with blades distributed around said rotor; transmission means; a generator connected to said transmission means; said transmission means and said generator being mounted by an azimuth bearing on a mast; a two-stage planetary transmission with an input stage and an output stage; said input stage and said output stage each having a planetary base carrier, planet gears, a hollow wheel and a sun wheel; said input stage having double-helical tooth forms and said output stage having single-helically geared planet wheels; said planet gears in said output stage being staged with stages, one of said stages engaging said hollow wheel and another of said stages engaging said sun wheel; a transmission housing, a hub in said rotor; said transmission housing being connected to said hub and being mounted by two large roller bearings on said planetary base carrier in said input stage, said large roller bearings comprising also a bearing set for said rotor; said sun wheel in said input stage being shiftable back-and-forth in said planetary base carrier in said output stage; said sun wheel being inhibited from rotating in said base carrier in said output stage, said base carrier in said output stage being slidable back-and-forth and being secured only by gears; a generator housing; said planetary base carrier in said input stage being connected to said generator housing; said generator housing having a foot connected to an azimuth bearing.

3. A transmission arrangement as defined in claim 2, wherein said sun wheel in said output stage has a shaft extending through the sun wheel in said input stage.

4. A transmission as defined in claim 2, including a brake in said transmission housing.

5. A transmission as defined in claim 1, wherein said sun wheel in said output stage is directly connected to a shaft of said generator.

6. A transmission as defined in claim 2, wherein said sun wheel in said output stage is directly connected to a shaft of said generator.

7. A transmission arrangement for a wind-power plant comprising: a rotor with blades distributed around said rotor; transmission means; a generator connected to said transmission means; said transmission means and said generator being mounted by an azimuth bearing on a mast; a two-stage planetary transmission with an input stage and an output stage; said input stage and said output stage each having a planetary base carrier, planet gears, a hollow wheel and a sun wheel; said input stage having double-helical tooth forms and said output stage having single-helically geared planet wheels; said planet gears in said output stage being staged with stages, one of said stages engaging said hollow wheel and another of said stages engaging said sun wheel; a transmission housing, a hub in said rotor; said transmission housing being connected to said hub and being mounted by two large roller bearings on said planetary base carrier in said input stage, said large roller bearings comprising also a bearing set for said rotor; said sun wheel in said input stage being shiftable back-and-forth in said planetary base carrier in said output stage; said sun wheel being inhibited from rotating in said base carrier in said output stage, said base carrier in said output stage being slidable back-and-forth and being secured only by gears; a generator housing; said planetary base carrier in said input stage being connected to said generator housing; said generator housing having a foot connected to an azimuth bearing; said sun wheel in said output stage having a shaft extending through the sun wheel in said input stage; a brake in said transmission housing; said sun wheel in said output stage being directly connected to a shaft of said generator.

* * * * *